US011176178B2

(12) United States Patent
Akimoto et al.

(10) Patent No.: US 11,176,178 B2
(45) Date of Patent: Nov. 16, 2021

(54) REQUIREMENT ANALYSIS APPARATUS, REQUIREMENT ANALYSIS METHOD, AND COMPUTER READABLE MEDIUM

(71) Applicant: Mitsubishi Electric Corporation, Tokyo (JP)

(72) Inventors: Takahiro Akimoto, Tokyo (JP); Toshihiro Kobayashi, Tokyo (JP); Toshiki Kitajima, Tokyo (JP); Yasuo Hosotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 202 days.

(21) Appl. No.: 16/468,868

(22) PCT Filed: Jan. 31, 2017

(86) PCT No.: PCT/JP2017/003443

§ 371 (c)(1),
(2) Date: Jun. 12, 2019

(87) PCT Pub. No.: WO2018/142477

PCT Pub. Date: Aug. 9, 2018

(65) Prior Publication Data

US 2020/0073875 A1 Mar. 5, 2020

(51) Int. Cl.
*G06F 7/00* (2006.01)
*G06F 16/28* (2019.01)
(Continued)

(52) U.S. Cl.
CPC ........ *G06F 16/285* (2019.01); *G06F 16/2272* (2019.01); *G06N 5/04* (2013.01)

(58) Field of Classification Search
CPC ...... G06F 16/285; G06F 16/2272; G06N 5/04
(Continued)

(56) References Cited

U.S. PATENT DOCUMENTS

2009/0044168 A1 2/2009 Hunter et al.
2014/0046943 A1* 2/2014 Scott ...................... G06F 16/51 707/737

FOREIGN PATENT DOCUMENTS

JP H09223040 A 8/1997
JP 2003108405 A 4/2003
(Continued)

OTHER PUBLICATIONS

International Search Report (PCT/ISA/210) dated Apr. 4, 2017, by the Japan Patent Office as the International Searching Authority for International Application No. PCT/JP2017/003443.

*Primary Examiner* — Isaac M Woo
(74) *Attorney, Agent, or Firm* — Buchanan Ingersoll & Rooney PC

(57) ABSTRACT

In a requirement analysis apparatus, a connection analysis unit classifies a plurality of requirement items into groups based on connections between requirement items indicated in item connection information. A subsystem analysis unit extracts the number of subsystems that are reached by tracing the connections from each requirement item, based on the connections between the requirement items indicated in the item connection information and based on the connection between each requirement item indicated in the item connection information and each subsystem. A result display unit displays, for each requirement item of the plurality of requirement items, analysis result information which is set with an identifier identifying a group into which the requirement item has been classified, and the number of subsystems being reached by tracing the connections from the requirement item.

12 Claims, 17 Drawing Sheets

(51) Int. Cl.
*G06F 16/22* (2019.01)
*G06N 5/04* (2006.01)

(58) Field of Classification Search
USPC .................................................. 707/600–899
See application file for complete search history.

(56) References Cited

FOREIGN PATENT DOCUMENTS

| | | | |
|---|---|---|---|
| JP | 2009009212 | A | 1/2009 |
| JP | 2010140166 | A | 6/2010 |
| JP | 2011028313 | A | 2/2011 |
| JP | 2011248581 | A | 12/2011 |
| JP | 2012226652 | A | 11/2012 |
| JP | 2014115884 | A | 6/2014 |
| JP | 2015049659 | A | 3/2015 |

* cited by examiner

| REQUIREMENT ITEM | |
|---|---|
| • REQUIREMENT ITEM NAME | |
| • GROUP NAME | INITIAL VALUE: REQUIREMENT ITEM NAME |
| • HIGHEST-ORDER REQUIREMENT ITEM FLAG | INITIAL VALUE: OFF |
| • LOWEST-ORDER REQUIREMENT ITEM FLAG | INITIAL VALUE: OFF |
| • RELATED-SUBSYSTEMS NUMBER | INITIAL VALUE: 0 |

Fig. 15

30 : ANALYSIS RESULT INFORMATION

| 601 REQUIREMENT ITEM NAME | 602 GROUP NAME | 603 HIGHEST-ORDER REQUIREMENT ITEM FLAG | 604 LOWEST-ORDER REQUIREMENT ITEM FLAG | 605 RELATED-SUBSYSTEMS NUMBER |
|---|---|---|---|---|
| PRODUCTIVITY IMPROVEMENT | PRODUCTIVITY IMPROVEMENT | ON | OFF | 3 |
| ERROR PREVENTION | PRODUCTIVITY IMPROVEMENT | OFF | OFF | 1 |
| WORKING HOURS REDUCTION | PRODUCTIVITY IMPROVEMENT | OFF | OFF | 3 |
| SCREW NON-TIGHTENING PREVENTION | PRODUCTIVITY IMPROVEMENT | OFF | ON | 1 |
| WORK PACEMAKER | WORK PACEMAKER | ON | ON | 2 |
| COMPONENT/TOOL SEARCH HOURS REDUCTION | PRODUCTIVITY IMPROVEMENT | OFF | ON | 2 |
| DISPLAY OF WORKING PROCEDURE | DISPLAY OF WORKING PROCEDURE | ON | ON | 1 |
| TURNING-ON LAMP | TURNING-ON LAMP | ON | ON | 2 |

REQUIREMENT ANALYSIS APPARATUS, REQUIREMENT ANALYSIS METHOD, AND COMPUTER READABLE MEDIUM

TECHNICAL FIELD

The present invention relates to a requirement analysis apparatus, requirement analysis method, and requirement analysis program for improving the quality of test design.

BACKGROUND ART

In test design in development of an embedded system, test items corresponding to requirement items needed in the embedded system are generated. When the requirement items increase and become complicated, missing out and overlapping of test items are likely to occur inadvertently. In view of this, Patent Literatures 1 and 2 disclose a technique of reducing missing out and overlapping of test items by illustrating or detailing, and analyzing the requirement items.

CITATION LIST

Patent Literature

Patent Literature 1: JP 2012-226652
Patent Literature 2: JP 2003-108405

SUMMARY OF INVENTION

Technical Problem

With the technique disclosed in Patent Literature 1, relevance between a plurality of test items are illustrated so that the test items are optimized, thereby reducing missing out and overlapping.

With the technique disclosed in Patent Literature 2, test items are detailed and the behavior elements of the system are divided up into minimum units, thereby reducing missing out and overlapping of the test items.

However, in order to formulate test items free from missing out and overlapping more reliably based on test items organized in a diagram as in Patent Literatures 1 and 2, another index is required.

The present invention has as its objective to automatically calculate, based on requirement items organized in a diagram, another index for evaluating relevance of each requirement item, so that missing out and overlapping of test items can be prevented more reliably.

Solution to Problem

A requirement analysis apparatus according to the present invention, for analyzing item connection information which indicates connections between requirement items of a plurality of requirement items needed in an embedded system having a plurality of subsystems and which indicates a connection between each requirement item of the plurality of requirement items and each subsystem of the plurality of subsystems, the requirement analysis apparatus includes:

a connection analysis unit to classify the plurality of requirement items into groups based on the connections between the requirement items indicated in the item connection information;

a subsystem analysis unit to extract a number of subsystems that are reached by tracing the connections from each requirement item of the plurality of requirement items, based on the connections between the requirement items and based on the connection between each requirement item of the plurality of requirement items and each subsystem of the plurality of subsystems; and a result display unit to display, for each requirement item of the plurality of requirement items, analysis result information which is set with an identifier identifying a group into which the requirement item has been classified, and the number of subsystems being reached by tracing the connections from the requirement item.

Advantageous Effects of Invention

In a requirement analysis apparatus according to the present invention, a connection analysis unit classifies a plurality of requirement items into groups based on connections between requirement items indicated in item connection information. A subsystem analysis unit extracts the number of subsystems that are reached by tracing the connections from each requirement item, based on the connections, between the requirement items, indicated in the item connection information and based on the connection, indicated in the item connection information, between each requirement item and each subsystem. A result display unit displays, for each requirement item of the plurality of requirement items, analysis result information which is set with an identifier identifying a group into which the requirement item has been classified, and the number of subsystems being reached by tracing the connections from the requirement item. Therefore, with the requirement item analysis apparatus according to the present invention, another index for evaluating relevance of each requirement item can be presented automatically.

BRIEF DESCRIPTION OF DRAWINGS

FIG. 15 is a diagram illustrating an example of analysis result information 30 according to Embodiment 1.

DESCRIPTION OF EMBODIMENTS

Figure 1:
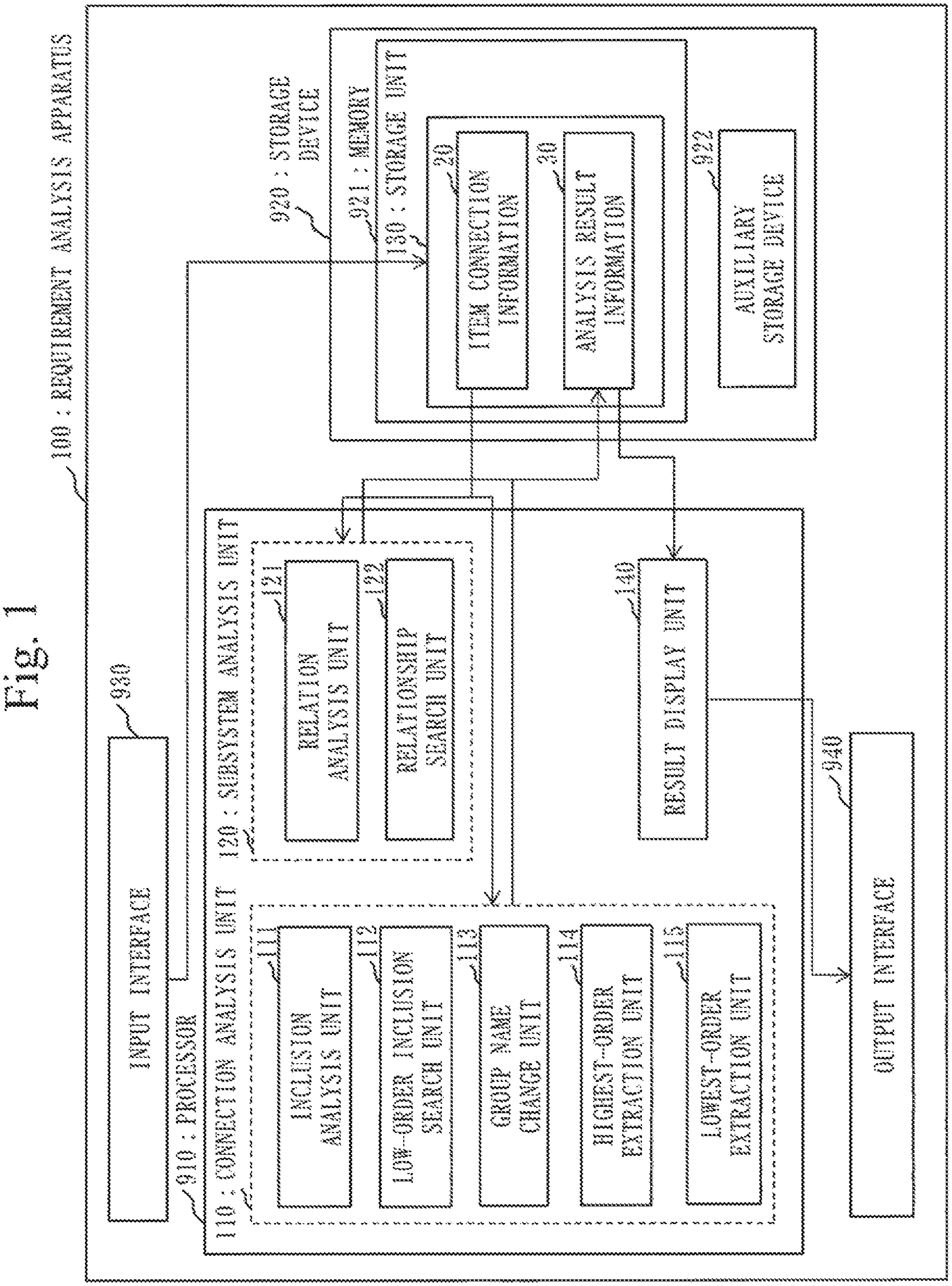
FIG. 1 is a block diagram of a requirement analysis apparatus 100 according to Embodiment 1.

An embodiment of the present invention will be described below with referring to drawings. Note that the same or equivalent portions in the drawings are denoted by the same reference numerals. In describing the embodiment, explanation for the same or equivalent portions will be omitted or simplified appropriately.

In order to formulate specific test items free from missing out and overlapping based on requirement items or test items organized in a diagram, another index is required for evaluating relevance of each item. Examples (A) and (B) of another index for evaluating the relevance of each item are described below.

(A) An index for grouping a plurality of items that are in an inclusive connection. In a system evaluation test, in order to reduce the man-hours of the test, it is desirable to conduct the test with narrowing a plurality of items in an inclusive connection and presumably involving overlapping contents down to several items. The narrowing down may be performed in various manners. As a specific example, in a test conducted in terms of logicality, the items may be narrowed down to those having low abstractness. In a test conducted in term of usability, the items may be narrowed down to those having high abstractness. Also, with the grouping, the entire system can be grasped as a whole, so that missing out of an item can be found easily.

(B) An index for determining a test phase where a test for an item is conducted. In system evaluation, generally, tests are conducted in different test phases dividedly in accordance with the granularities of the items. Then, if the role allotment between the test phases is ambiguous, missing out or overlapping of test items tends to occur between the test phases. In particular, when conducting tests of a composite system in which a plurality of subsystems are related, role allotment is unclear between an evaluation test of the entire system and an evaluation test of each subsystem, and accordingly missing out or overlapping of test items might occur undesirably. In order to avoid this, instead of formulating the items for each individual test phase, requirement items needed in the entire system are extracted, and the respective requirement items are classified between requirement items evaluated in the evaluation test of each subsystem and requirement items evaluated in the evaluation test of the entire system.

Embodiment 1

*Description of Configuration*

A configuration of a requirement analysis apparatus 100 according to this embodiment will be described with referring to FIG. 1.

As illustrated in FIG. 1, the requirement analysis apparatus 100 is a computer. The requirement analysis apparatus 100 is provided with hardware devices such as a processor 910, a storage device 920, an input interface 930, and an output interface 940. The storage device 920 has a memory 921 and an auxiliary storage device 922. The processor 910 is connected to the other hardware devices via signal lines and controls the other hardware devices.

The requirement analysis apparatus 100 is provided with a connection analysis unit 110, a subsystem analysis unit 120, a storage unit 130, and a result display unit 140, as constituent elements. The connection analysis unit 110 has an inclusion analysis unit 111, a low-order inclusion search unit 112, a group name change unit 113, a highest-order extraction unit 114, and a lowest-order extraction unit 115. The subsystem analysis unit 120 has a relation analysis unit 121 and a relationship search unit 122.

The functions of the inclusion analysis unit 111, low-order inclusion search unit 112, group name change unit 113, highest-order extraction unit 114, lowest-order extraction unit 115, relation analysis unit 121, relationship search unit 122, and result display unit 140 are implemented by software.

The storage unit 130 is implemented by the memory 921. Item connection information 20 which has been inputted via the input interface 930 is stored in the storage unit 130. The analysis result information 30 which is an analysis result of the requirement item connections is stored in the storage unit 130 by the processor 910. The storage unit 130 may be implemented by the memory 921 and auxiliary storage device 922. Alternatively, the storage unit 130 may be implemented by only the auxiliary storage device 922. The storage unit 130 is implemented in an arbitrary manner.

A requirement analysis program 510 which implements the functions of the inclusion analysis unit 111, low-order inclusion search unit 112, group name change unit 113, highest-order extraction unit 114, lowest-order extraction unit 115, relation analysis unit 121, relationship search unit 122, and result display unit 140 is stored in the auxiliary storage device 922. This program is read into the memory 921 by the processor 910 and executed by the processor 910. Consequently, the functions of the inclusion analysis unit 111, low-order inclusion search unit 112, group name change unit 113, highest-order extraction unit 114, lowest-order extraction unit 115, relation analysis unit 121, relationship search unit 122, and result display unit 140 are implemented. Also, an OS (Operating System) is also stored in the auxiliary storage device 922. The OS is loaded to the memory 921 at least partly. The processor 910 executes the requirement analysis program 510 while executing the OS.

The processor 910 is an IC (Integrated Circuit) which performs arithmetic processing. A specific example of the processor 910 is a CPU (Central Processing Unit), a DSP (Digital Signal Processor), or a GPU (Graphics Processing Unit).

The memory 921 is a storage equipment that stores data temporarily. A specific example of the memory 921 is an SRAM (Static Random Access Memory) or a DRAM (Dynamic Random Access Memory).

The auxiliary storage device 922 is a storage equipment that saves data. A specific example of the auxiliary storage device 922 is an HDD (Hard Disk Drive). Also, the auxiliary storage device 922 may be a portable storage medium such as an SD (registered trademark) (Secure Digital) memory card, a CF (CompactFlash), a NAND flash, a flexible disk, an optical disk, a compact disk, a blu-ray (registered trademark) disk, and a DVD (Digital Versatile Disk).

The input interface 930 is a port to be connected to an input device such as a mouse, a keyboard, and a touch panel. A specific example of the input interface 930 is a USB (Universal Serial Bus) terminal. Also, the input interface may be a port to which a LAN (Local Area Network) is connected.

The output interface 940 is a port to which a cable of a display equipment such as a display is connected. A specific example of the output interface 940 is a USB terminal or an HDMI (registered trademark) terminal. A specific example of the display is an LCD (Liquid Crystal display).

The requirement analysis apparatus 100 may be provided with only one processor, or a plurality of processors. The plurality of processors may cooperate with each other to execute the program that implements the functions of the inclusion analysis unit 111, low-order inclusion search unit 112, group name change unit 113, highest-order extraction unit 114, lowest-order extraction unit 115, relation analysis unit 121, relationship search unit 122, and result display unit 140.

Information, data, signal values, and variable values representing the processing results of the inclusion analysis unit 111, low-order inclusion search unit 112, group name change unit 113, highest-order extraction unit 114, lowest-order extraction unit 115, relation analysis unit 121, relationship search unit 122, and result display unit 140 are stored in the auxiliary storage device 922 or memory 921, or in a register or cache memory in the processor 910.

A requirement analysis program product is a storage medium or storage device storing the program that implements the functions described as the inclusion analysis unit 111, low-order inclusion search unit 112, group name change unit 113, highest-order extraction unit 114, lowest-order extraction unit 115, relation analysis unit 121, relationship search unit 122, and result display unit 140. The requirement analysis program product refers to any product in which a computer readable program is loaded, irrespective of its appearance.

Figure 2:
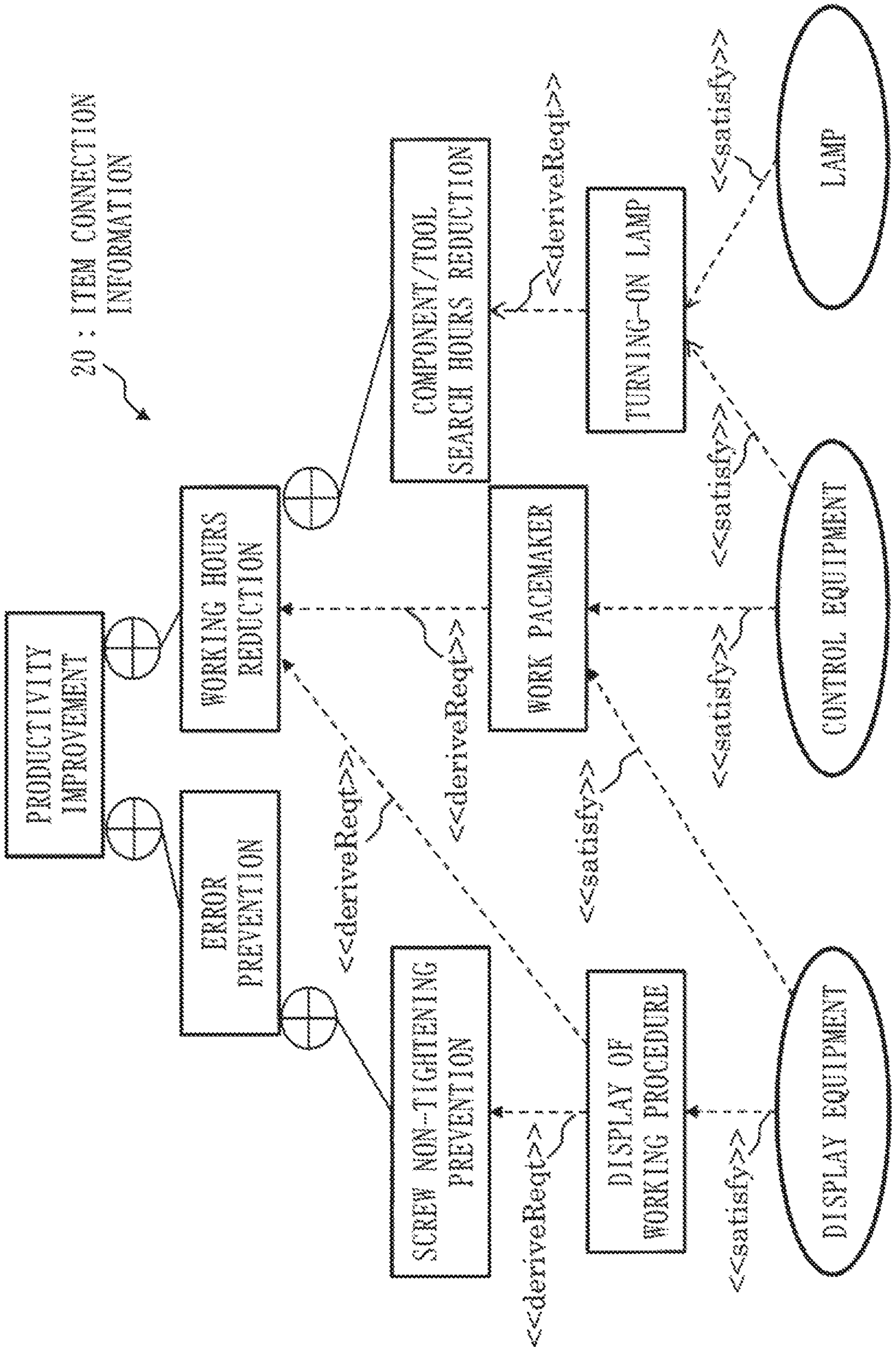
FIG. 2 is a diagram illustrating an example of item connection information 20 according to Embodiment 1.
Figure 3:
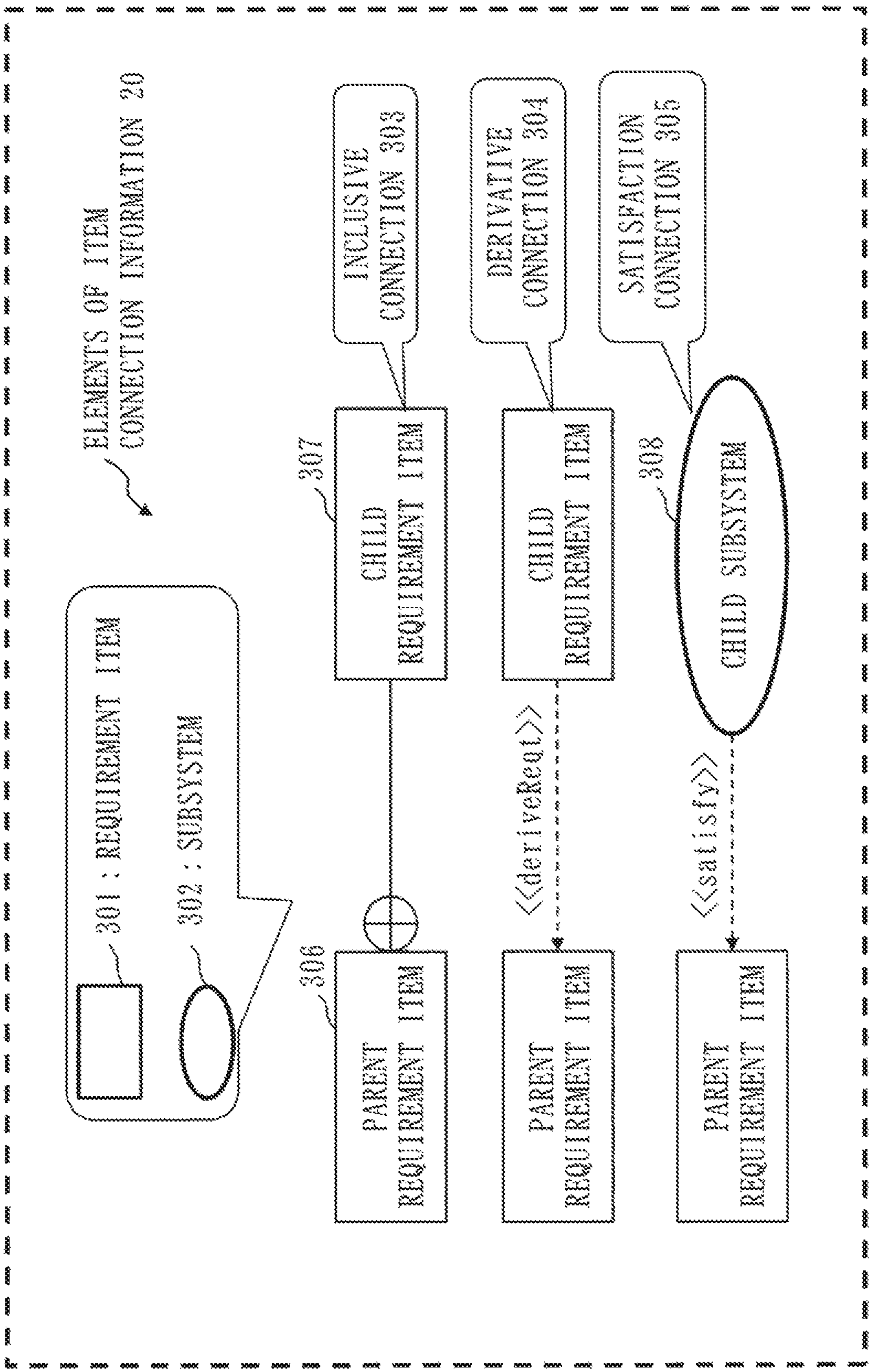
FIG. 3 is an explanatory diagram of the elements of the item connection information 20 according to Embodiment 1.

FIG. 2 is a diagram illustrating a configuration of the item connection information 20 according to this embodiment. FIG. 3 is an explanatory diagram of the elements of the item connection information 20 according to this embodiment.

The item connection information 20 according to this embodiment will be described with referring to FIGS. 2 and 3.

The item connection information 20 includes requirement items organized in a diagram. As the item connection information 20, a type is known in which the relevance between requirement items is indicated by means of an illustration or diagram such as a requirement diagram of modeling language SysML. This embodiment has as its objective to calculate an index for narrowing down the test targets or an index for judging the test phase quantitatively, as an index for automatically determining specific test items.

The item connection information 20 indicates connections between requirement items of a plurality of requirement items needed in an embedded system having a plurality of subsystems, and indicates a connection between each requirement item of the plurality of requirement items and each subsystem of the plurality of subsystems.

As illustrated in FIGS. 2 and 3, the item connection information 20 includes a requirement item 301, a subsystem 302, an inclusive connection 303 and a derivative connection 304 each indicating a connection between the requirement items, and a satisfaction connection 305 indicating a connection between a requirement item and a subsystem.

The inclusive connection 303 is a connection indicating that one requirement item 301 called a parent requirement item 306 includes another requirement item 301 called a child requirement item 307. Herein, that a certain parent requirement item 306 is satisfied and that all child requirement items 307 maintaining inclusive connections with that parent requirement item 306 are satisfied are synonymous.

The derivative connection 304 is a connection indicating that, as a means for achieving one requirement item 301 called a parent requirement item 306, another requirement item 301 called a child requirement item 307 can be derived.

The satisfaction connection 305 is a connection indicating that a subsystem 302 called a child subsystem 308 is used in order to satisfy a requirement item 301 called a parent requirement item 306.

The inclusive connection 303 and the derivative connection 304 are examples of the connections among the requirement items of the plurality of requirement items. The satisfaction connection 305 is an example of a connection between each requirement item of the plurality of requirement items and each subsystem of the plurality of subsystems.

A connection between a parent requirement item and a child requirement item or child subsystem is a parent-child connection or a hierarchical connection. The parent requirement item is also called an upper-order requirement item. The child requirement item is also called a lower-order requirement item. The child subsystem is also called a lower-order subsystem.

*Description of Operation*

Figure 4:
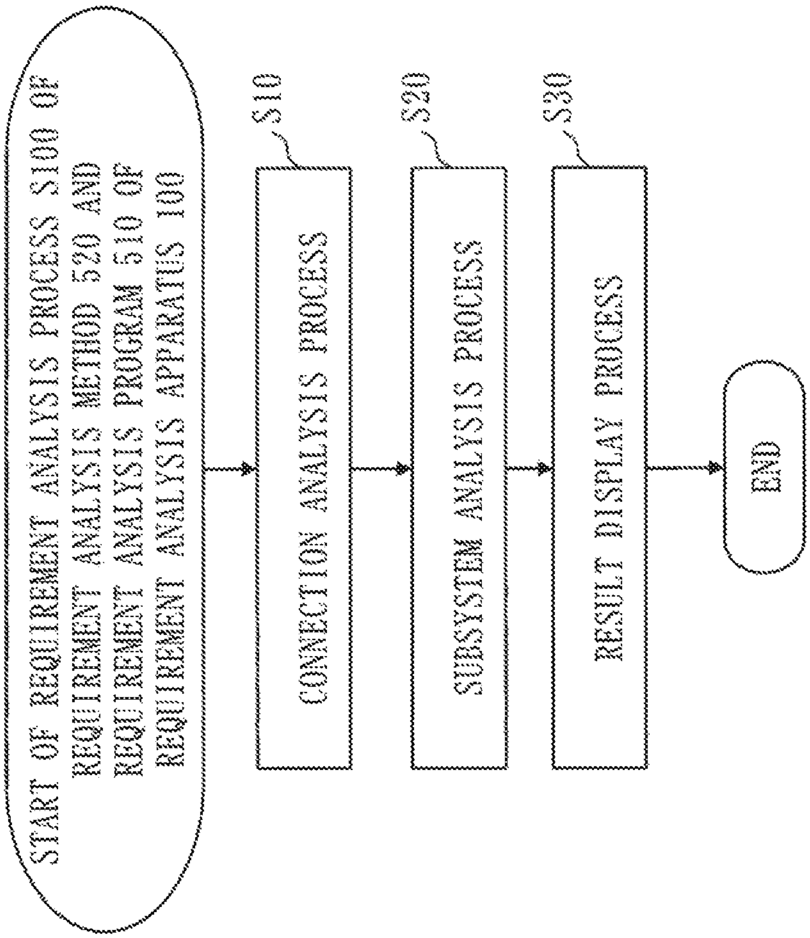
FIG. 4 is a flowchart of requirement analysis process S100 of a requirement analysis method 520 and requirement analysis program 510 of the requirement analysis apparatus 100 according to Embodiment 1.

Requirement analysis process S100 of a requirement analysis method 520 and requirement analysis program 510 of the requirement analysis apparatus 100 according to this embodiment will be described with referring to FIG. 4.

In requirement analysis process S100, the requirement analysis apparatus 100 analyzes the item connection information 20 which is a requirement diagram. Requirement analysis process S100 has connection analysis process S10, subsystem analysis process S20, and result display process S30.

In connection analysis process S10, the connection analysis unit 110 classifies the plurality of requirement items into groups based on the connections between the requirement items indicated in the item connection information 20. The connection analysis unit 110 classifies, under one group, requirement items extracted from the plurality of requirement items by tracing the same connection from each requirement item of the plurality of requirement items. The item connection information 20 indicates inclusive connections between the requirement items of the plurality of requirement items. The connection analysis unit 110 classifies, under one group, requirement items extracted from the plurality of requirement items by tracing the inclusive connections from each requirement item of the plurality of requirement items toward a lower order. That is, the connection analysis unit 110 analyzes the inclusive connection of each requirement item of the item connection information 20.

In subsystem analysis process S20, the subsystem analysis unit 120 extracts the number of subsystems that are reached by tracing the connections from each requirement item of the plurality of requirement items, based on the connections between the requirement items and based on the connection between each requirement item of the plurality of requirement items and each subsystem of the plurality of subsystems. The subsystem analysis unit 120 extracts the number of subsystems that are reached by tracing a connection between requirement items that maintain a hierarchical connection, or tracing a connection between each requirement item and each subsystem that maintain a hierarchical connection, from an upper-order item toward a lower-order item. That is, the subsystem analysis unit 120 analyzes related subsystems of each requirement item of the item connection information 20.

In result display process S30, the result display unit 140 displays, for each requirement item of the plurality of requirement items, analysis result information 30 which is set with an identifier identifying a group into which the requirement item has been classified, and the number of subsystems being reached by tracing the connections from the requirement item. The result display unit 140 displays the analysis result information 30 to a display equipment such as a display via the output interface 940.

Figure 5:
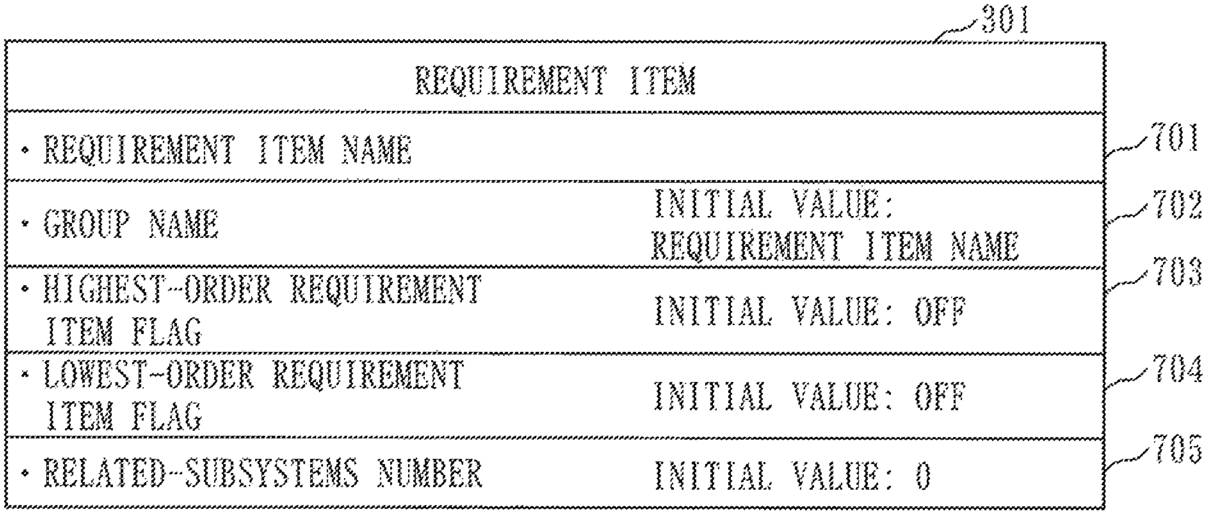
FIG. 5 is a diagram illustrating an example of a requirement item 301 according to Embodiment 1.

A configuration of the requirement item 301 according to this embodiment will be described with referring to FIG. 5. The requirement item 301 has a requirement item name 701, a group name 702, a highest-order requirement item flag 703, a lowest-order requirement item flag 704, and a related-subsystems number 705. The initial value of the group name 702 coincides with the requirement item name 701.

<Connection Analysis Process S10>

Connection analysis process S10 has inclusion analysis process S11 conducted by the inclusion analysis unit 111, lower-order inclusion search process S12 conducted by the low-order inclusion search unit 112, group name change process S13 conducted by the group name change unit 113, highest-order extraction process S14 conducted by the highest-order extraction unit 114, and lowest-order extraction process S15 conducted by the lowest-order extraction unit 115.

Figure 6:
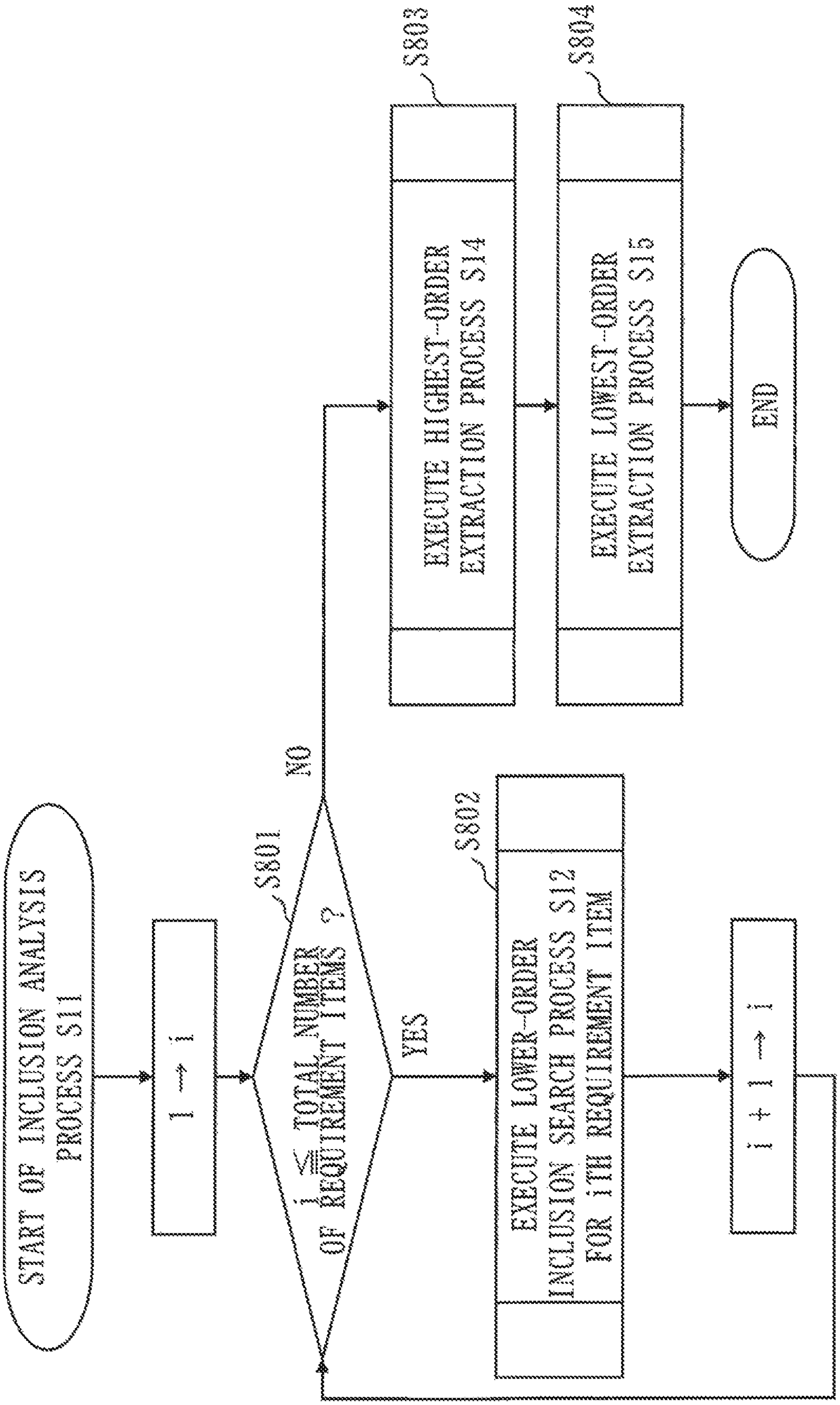
FIG. 6 is a flowchart illustrating inclusion analysis process S11 according to Embodiment 1.

Inclusion analysis process S11 according to this embodiment will be described with referring to FIG. 6. Inclusion analysis process S11 is a routine executed first in connection analysis process S10.

Figure 7:
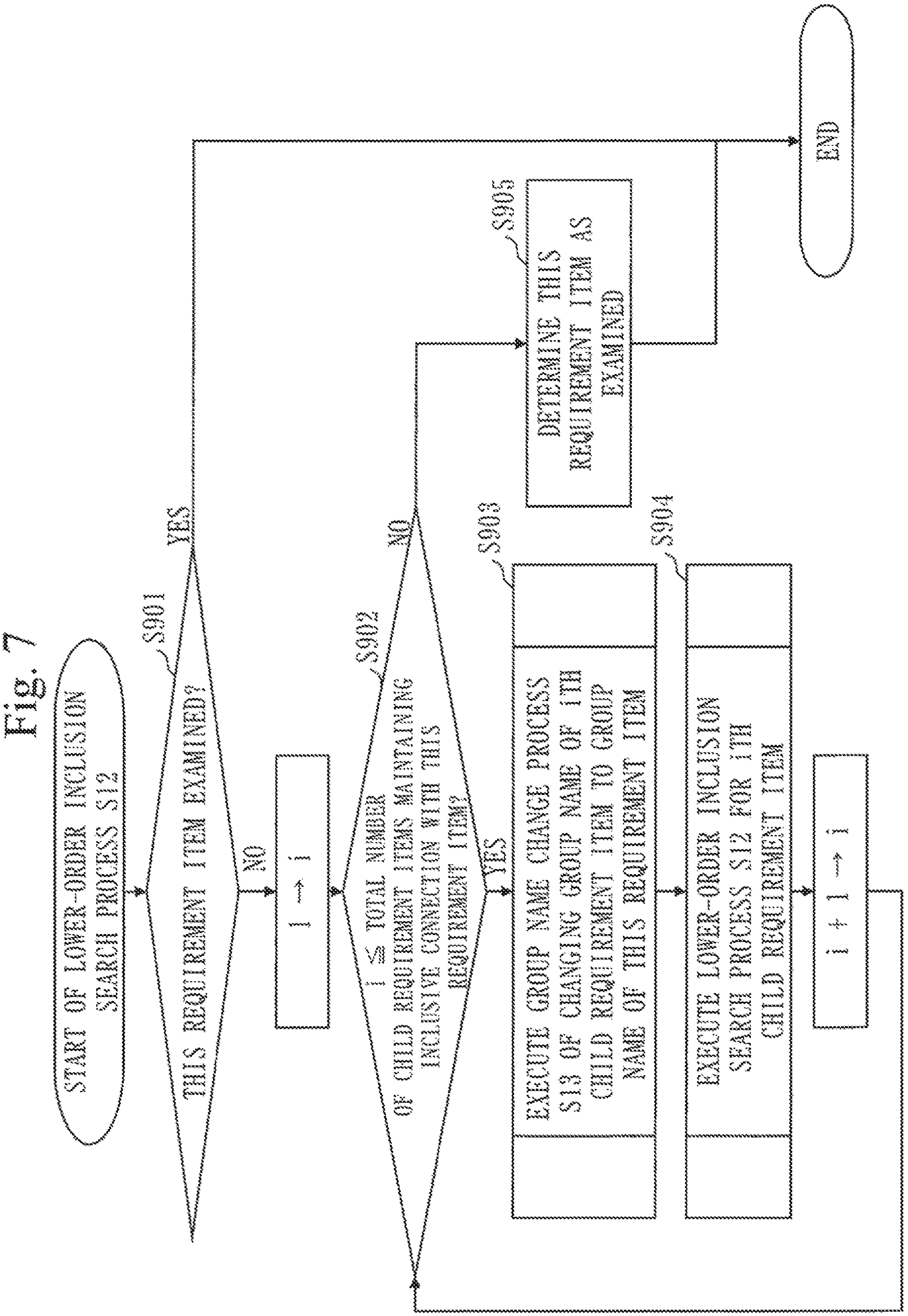
FIG. 7 is a flowchart illustrating lower-order inclusion search process S12 according to Embodiment 1.

Lower-order inclusion search process S12 according to this embodiment will be described with referring to FIG. 7. Lower-order inclusion search process S12 is a routine of extracting and searching for a child requirement item that maintains an inclusive connection with a given requirement item directly or indirectly.

Figure 8:
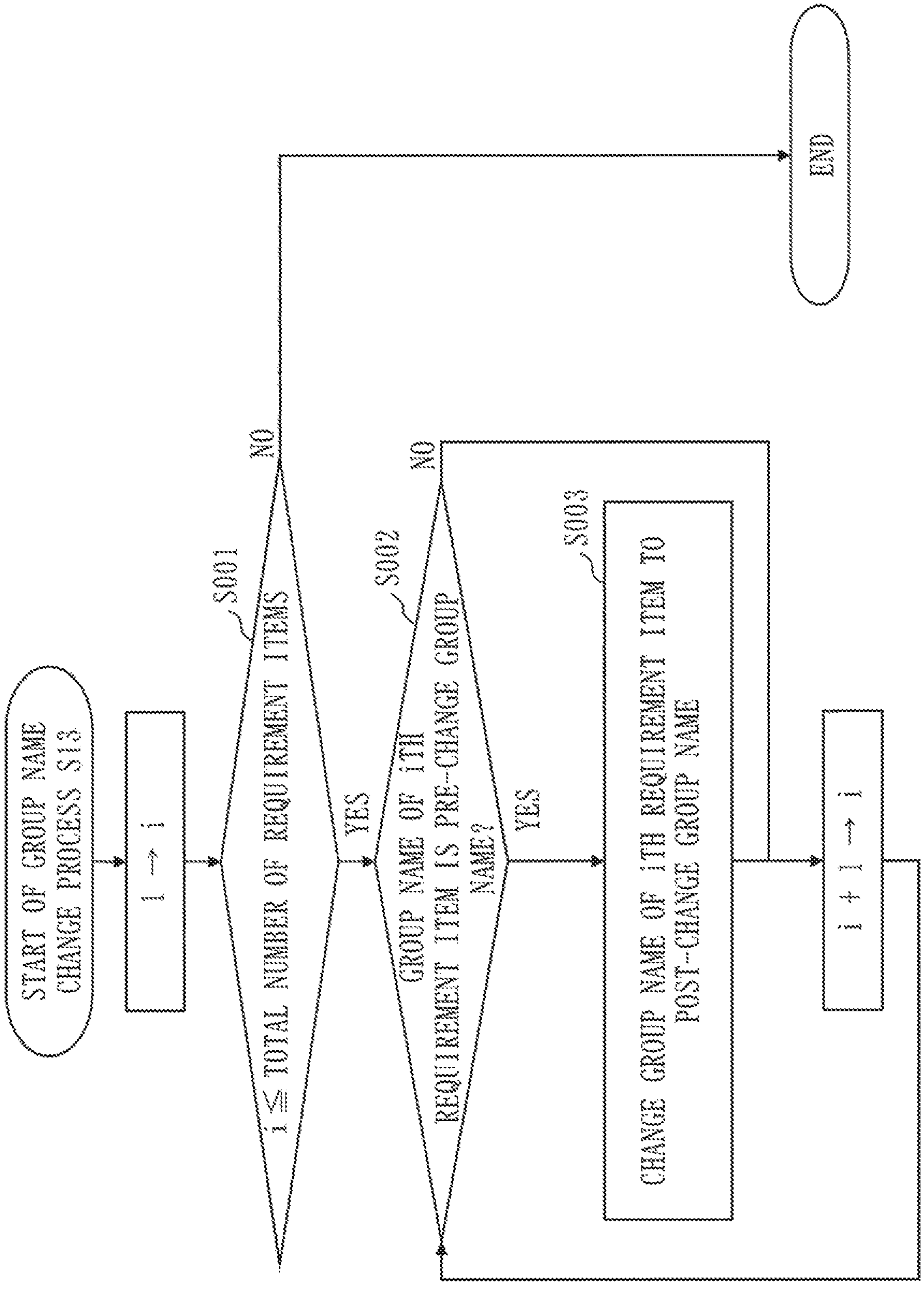
FIG. 8 is a flowchart illustrating group name change process S13 according to Embodiment 1.

Group name change process S13 according to this embodiment will be described with referring to FIG. 8. Group name change process S13 is a routine of changing a group name of a requirement item.

Figure 9:
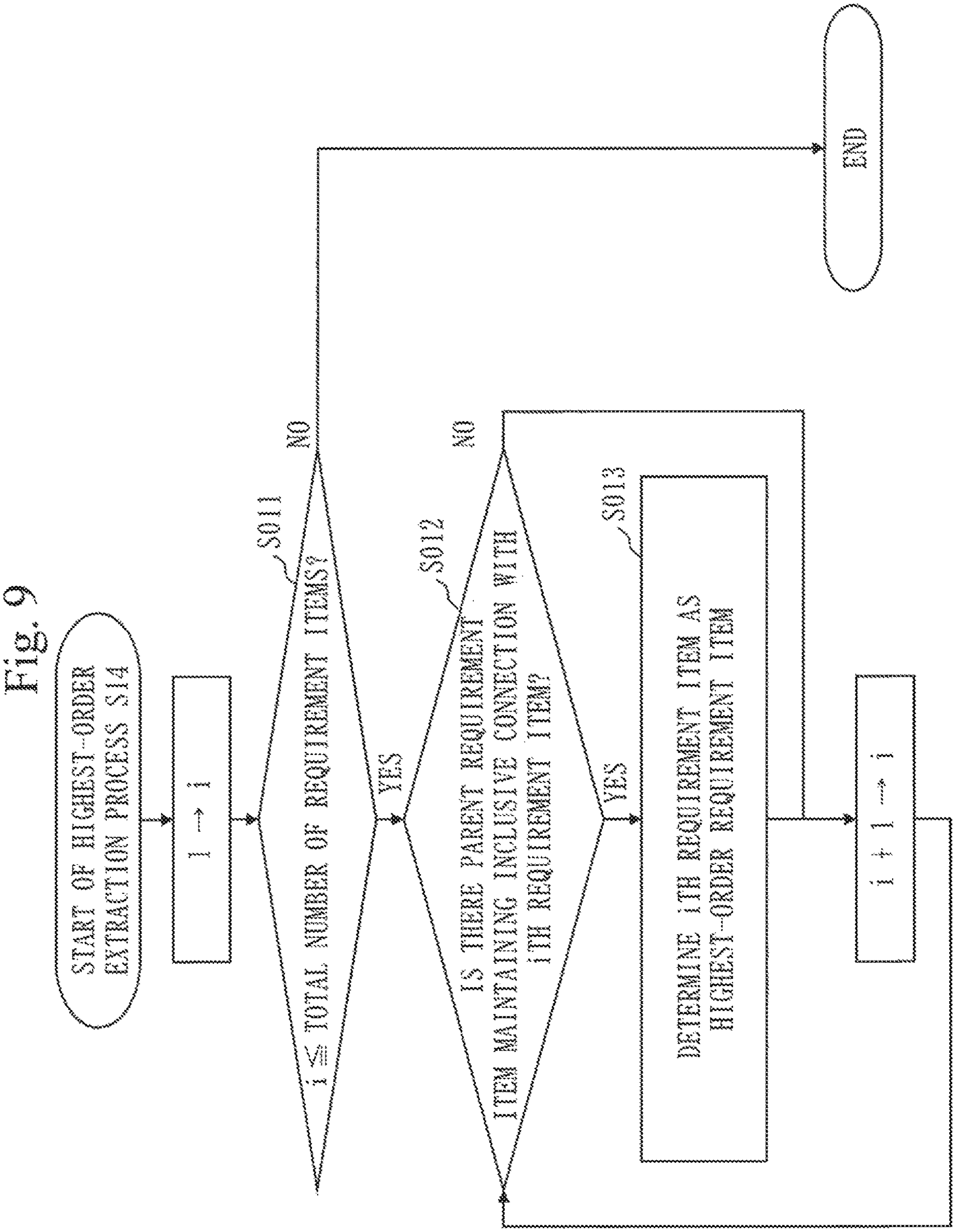
FIG. 9 is a flowchart illustrating highest-order extraction process S14 according to Embodiment 1.

Highest-order extraction process S14 according to this embodiment will be described with referring to FIG. 9. Highest-order extraction process S14 is a routine of extracting a requirement item being of the highest order in a group.

Figure 10:
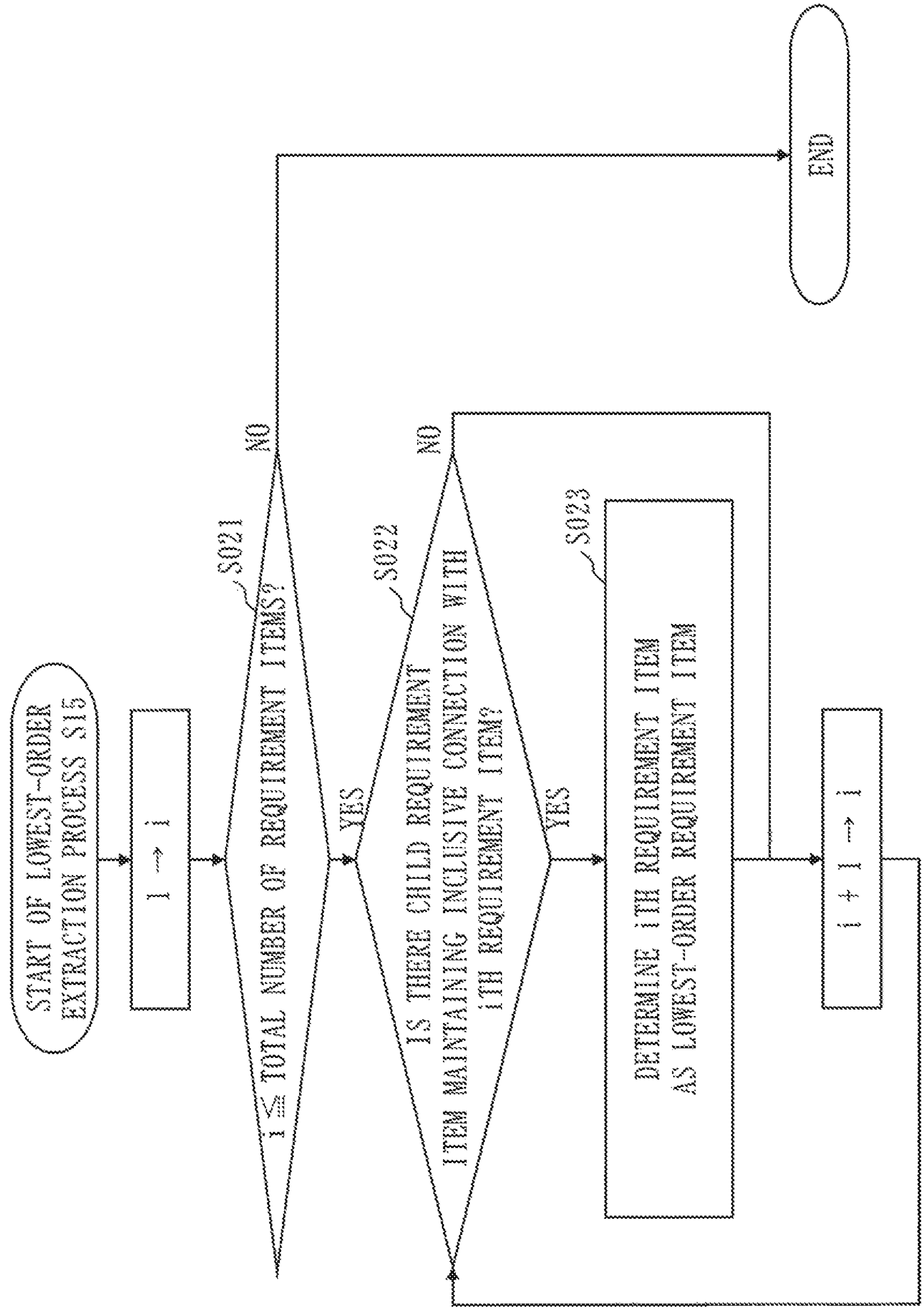
FIG. 10 is a flowchart illustrating lowest-order extraction process S15 according to Embodiment 1.

Lowest-order extraction process S15 according to this embodiment will be described with referring to FIG. 10. Lowest-order extraction process S15 is a routine of extracting a requirement item being of the lowest order in a group.

<Inclusion Analysis Process S11>

From step S801 through step S802, the inclusion analysis unit 111 executes lower-order inclusion search process S12 for an ith requirement item. The inclusion analysis unit 111 repeats the process of step S801 to step S802 until i reaches the total number of requirement items 301 included in the item connection information 20.

When i exceeds the total number of requirement items 301, in step S803, the inclusion analysis unit 111 executes highest-order extraction process S14. Then, in step S804, the inclusion analysis unit 111 executes lowest-order extraction process S15.

<Lower-Order Inclusion Search Process S12>

In step S901, the low-order inclusion search unit 112 confirms if a given requirement item 301 has been examined. If examined, the low-order inclusion search unit 112 ends the process.

If the given requirement item 301 has not been examined, the low-order inclusion search unit 112 repeats the process of step S902 to step S904 for each of the child requirement items that maintain an inclusive connection with the given requirement item 301.

In step S903, the low-order inclusion search unit 112 executes group name change process S13 for a child requirement item 307 that maintains the inclusive connection 303 where the given requirement item 301 is a parent requirement item 306. Specifically, the low-order inclusion search unit 112 executes group name change process S13 for an ith requirement item among the child requirement items 307 that maintain inclusive connections where the given requirement item 301 is the parent requirement item 306, by using a pre-change group name as the group name 702 of the child requirement item 307 and a post-change group name as the group name 702 of the parent requirement item 306. That is, the "pre-change group name" and the "post-change group name" are parameters to be inputted to the "group name change process S13".

In step S904, the low-order inclusion search unit 112 recursively executes lower-order inclusion search process S12 for the child requirement items 307 that maintain inclusive connections where the given requirement item 301 is the parent requirement item 306. Specifically, the low-order inclusion search unit 112 executes lower-order inclusion search process S12 for an ith requirement item among the child requirement items 307 that maintain inclusive connections 303 where the given requirement item 301 is the parent requirement item 306.

When i exceeds the total number of child requirement items 307 that maintain the inclusive connections with the given requirement item 301, then in step S905, the low-order inclusion search unit 112 determines the given requirement item 301 as examined.

<Group Name Change Process S13>

From step S001 through step S003, for every existing requirement item 301, if the group name 702 coincides with a pre-change group name, the group name change unit 113 changes the group name 702 to a post-change group name.

In highest-order extraction process S14 and lowest-order extraction process S15 described below, the connection analysis unit 110 extracts a requirement item of a highest order and a requirement item of a lowest order in one group, as a highest-order requirement item and a lowest-order requirement item, respectively.

<Highest-Order Extraction Process S14>

In step S011, the highest-order extraction unit 114 repeats steps S012 to S013 for every existing requirement item 301.

In step S012, the highest-order extraction unit 114 determines if there is a parent requirement item 306 that maintains an inclusive connection 303 where the ith requirement item 301 is a child requirement item 307. If there is not, then in step S013, the highest-order extraction unit 114 turns ON the highest-order requirement item flag 703 of the requirement item 301. If there is, the process returns to step S011.

<Lowest-Order Extraction Process S15>

In step S021, the lowest-order extraction unit 115 repeats steps S022 to S023 for every existing requirement item 301.

In step S022, the lowest-order extraction unit 115 determines if there is a child requirement item 307 that maintains an inclusive connection 303 where the ith requirement item 301 is a parent requirement item 306. If there is not, then in step S023, the lowest-order extraction unit 115 turns ON the lowest-order requirement item flag 704 of the requirement item 301. If there is, the process returns to step S021.

Figure 11:
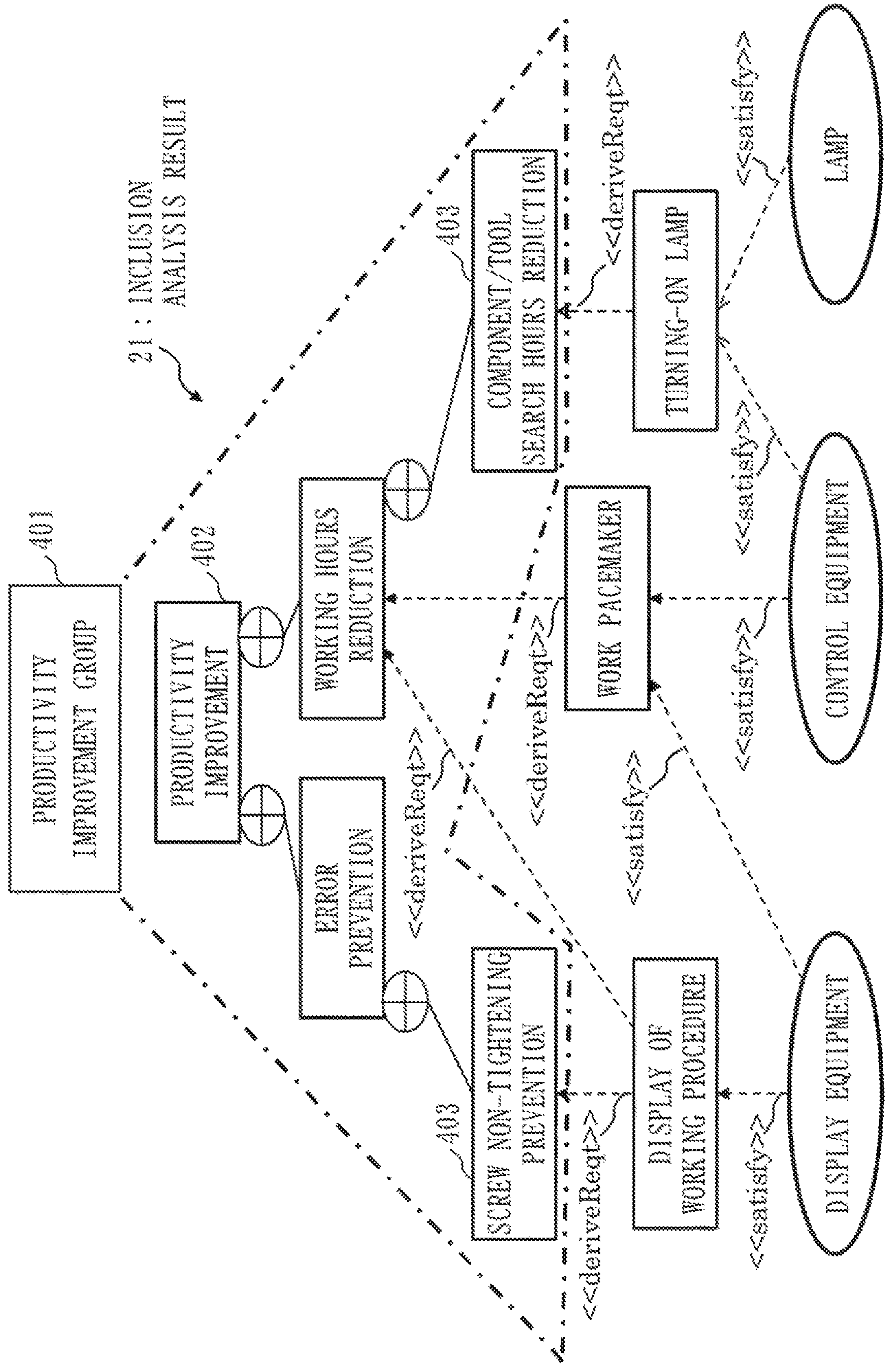
FIG. 11 is a drawing illustrating an example of an inclusion analysis result 21 which is an analysis result of the item connection information 20 by connection analysis process S10 according to Embodiment 1.

FIG. 11 is a diagram illustrating an inclusion analysis result 21 which is an analysis result of the item connection information 20 by connection analysis process S10 according to this embodiment.

By connection analysis process S10, requirement items surrounded by an alternate long and short dashed line are included in a productivity improvement group 401, as illustrated in FIG. 11. In the productivity improvement group 401, the requirement item of productivity improvement is a highest-order requirement item 402. In the productivity improvement group 401, a requirement item of screw non-tightening prevention and a requirement item of component/tool search hours reduction are lowest-order requirement items 403.

As described above, in connection analysis process S10, the connection analysis unit 110 classifies, under one group, requirement items extracted from the plurality of requirement items by tracing the inclusive connections from each requirement item of the plurality of requirement items toward a lower order.

Also, for each requirement item of the plurality of requirement items, the connection analysis unit 110 sets a name of the group into which the requirement item has been classified, as the identifier, and information indicating whether the requirement item is the highest-order requirement item or the lowest-order requirement item in the group into which the requirement item has been classified. "Productivity improvement", being the name of the group, is added to the productivity improvement group 401 illustrated in FIG. 11 as the identifier for identifying the group. Therefore, as illustrated in FIG. 5, in the requirement item 301, productivity improvement, being the name of the group, is added to the group name 702 as the identifier for identifying the group. The requirement item 301 has the highest-order requirement item flag 703 and the lowest-order requirement item flag 704 to set whether the requirement item 301 is the highest-order requirement item or the lowest-order requirement item.

<Subsystem Analysis Process S20>

Subsystem analysis process S20 has relation analysis process S21 conducted by the relation analysis unit 121 and relationship search process S22 conducted by the relationship search unit 122.

Figure 12:
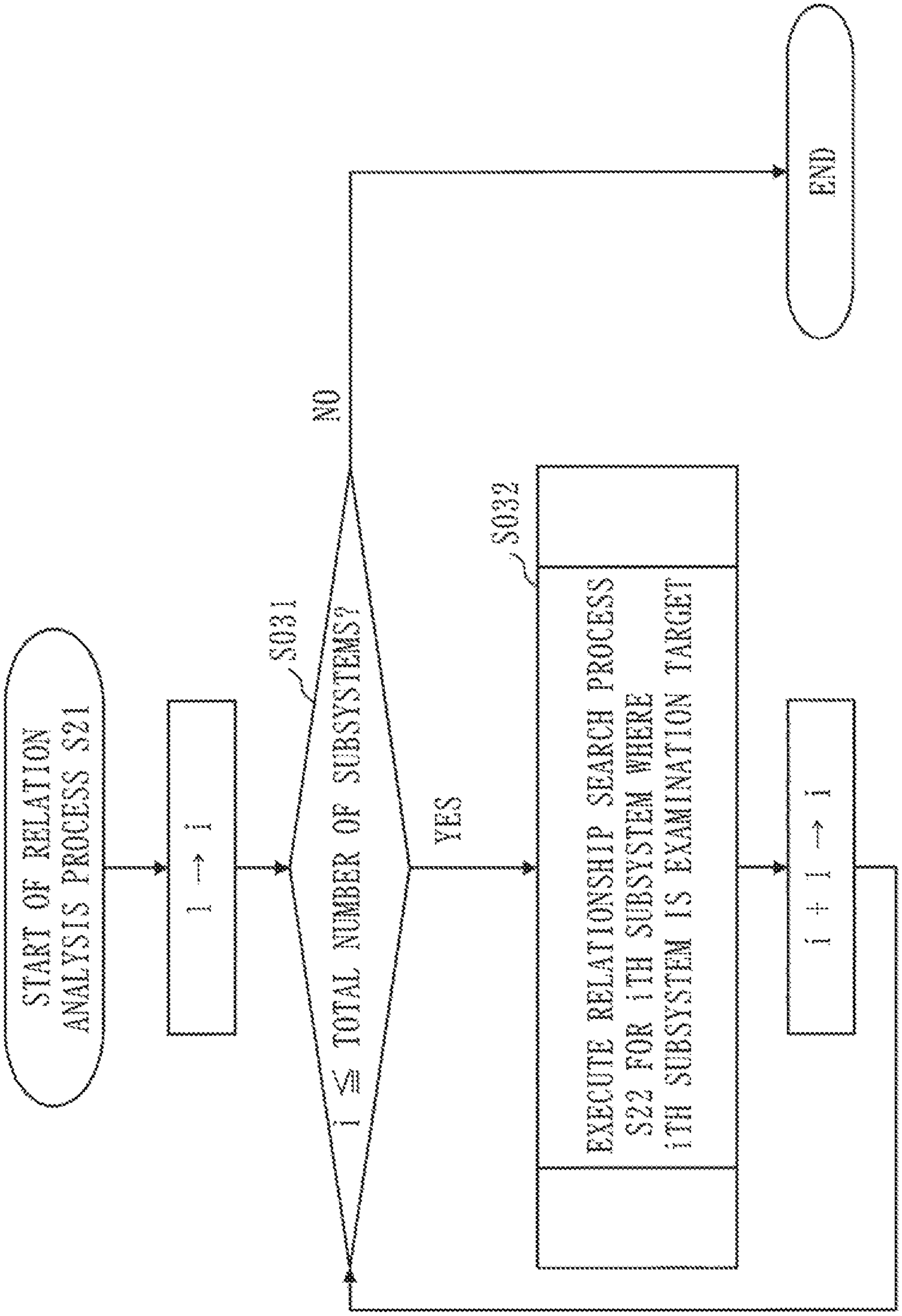
FIG. 12 is a flowchart illustrating relation analysis process S21 according to Embodiment 1.

Relation analysis process S21 according to this embodiment will be described with referring to FIG. 12. Relation analysis process S21 is a routine executed first in subsystem analysis process S20.

Figure 13:
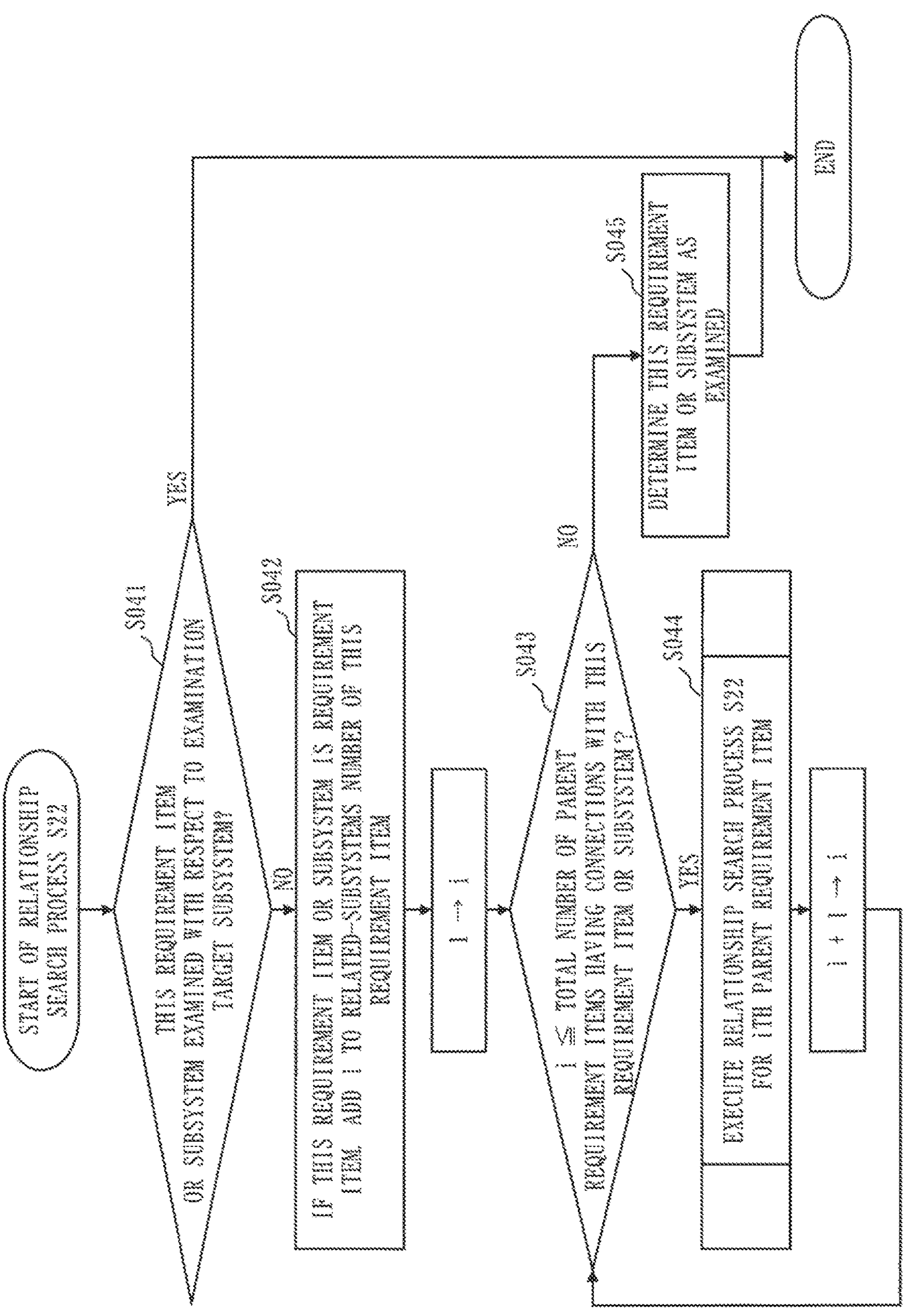
FIG. 13 is a flowchart illustrating relationship search process S22 according to Embodiment 1.

Relationship search process S22 according to this embodiment will be described with referring to FIG. 13. Relationship search process S22 is a process of extracting and searching for a parent requirement item that maintains a connection with a given requirement item or subsystem.

<Relation Analysis Process S21>

In step S031, the relation analysis unit 121 repeats the process of step S031 to step S32 until i reaches the total number of subsystems 302 included in the item connection information 20.

In step S032, for the ith subsystem 302, the relation analysis unit 121 executes relationship search process S22 where the ith subsystem 302 is the examination target.

<Relationship Search Process S22>

In step S041, the relationship search unit 122 confirms whether the given requirement item 301 or subsystem 302 has been examined with respect to the subsystem 302 being the examination target. If examined, the relationship search unit 122 ends the process. If not examined, the relationship search unit 122 advances the process to step S042.

In step S042, if the given requirement item 301 or subsystem 302 is a requirement item 301, the relationship search unit 122 adds 1 to the related-subsystems number 705 of the requirement item 301.

Subsequently, the relationship search unit 122 substitutes 1 for i, and repeats the process of step S043 to step S044 until i reaches the total number of parent requirement items each having a relationship with the given requirement item 301 or subsystem 302. The total number of parent requirement items each having a relationship with the given requirement item 301 or subsystem 302 is the total number of all parent requirement items 306 each having an inclusive connection 303, derivative connection 304, or satisfaction connection 305 where the given requirement item 301 or subsystem 302 is a child requirement item 307 or child subsystem 308.

In step S044, the relationship search unit 122 recursively executes relationship search process S22 for the ith parent requirement item.

When i exceeds the total number of parent requirement items each having a relationship with the given requirement item 301 or subsystem 302, then in step S045, the relationship search unit 122 determines the given requirement item 301 or subsystem 302 as examined.

Figure 14:
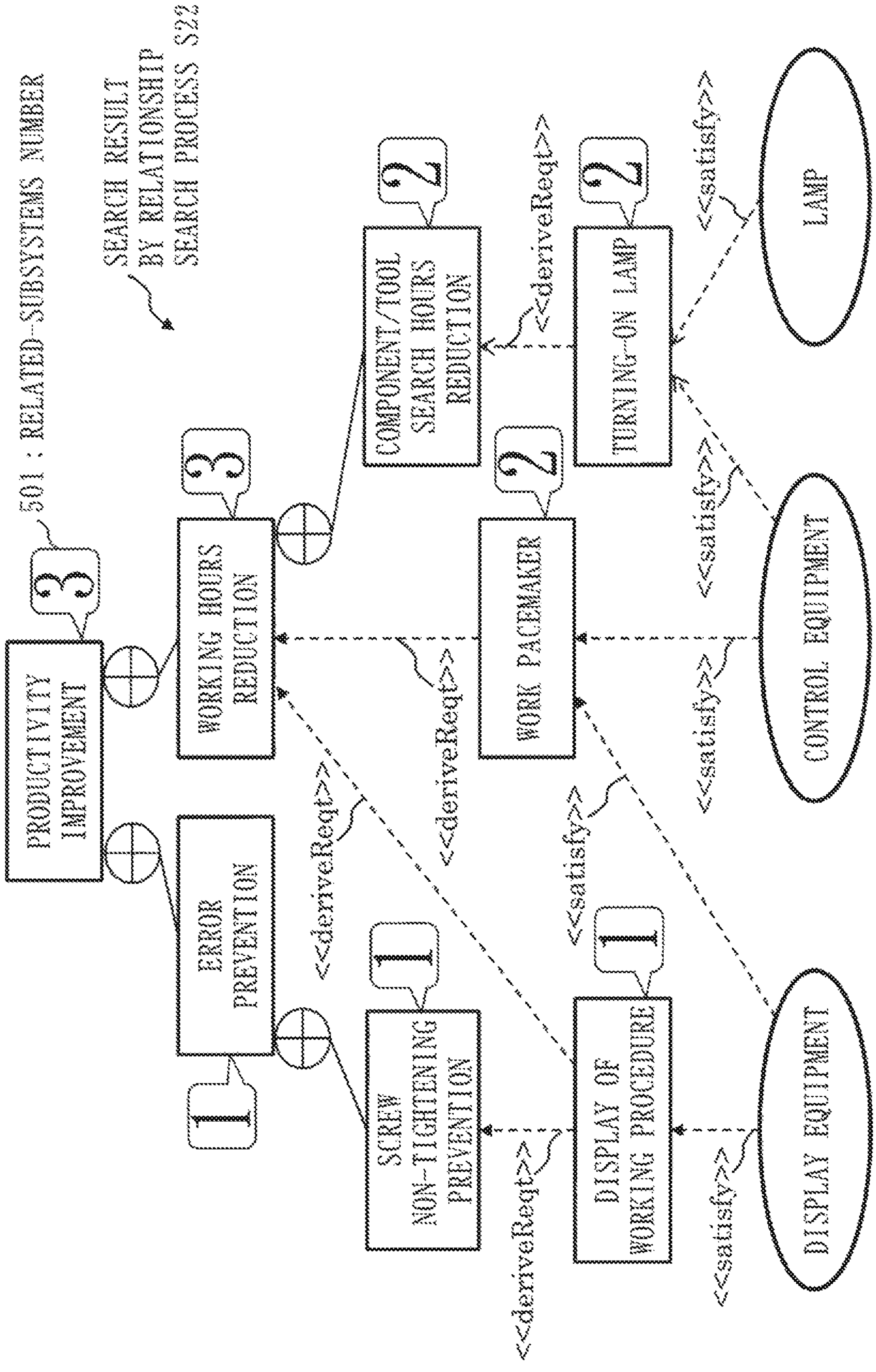
FIG. 14 is a search result of relationship search process S22 according to Embodiment 1.

FIG. 14 is a diagram illustrating a search result by relationship search process S22 according to this embodiment.

As illustrated in FIG. 14, by relationship search process S22, each requirement item is associated with a related-subsystems number 501 as the number of systems each related to each requirement item. In this manner, the number of subsystems related to each requirement item is calculated by relationship search process S22. The number of subsystems related to each requirement item is set in the related-subsystems number 705 illustrated in FIG. 5.

FIG. 15 is a diagram illustrating an example of the analysis result information 30 according to this embodiment.

As illustrated in FIG. 15, the processing results of connection analysis process S10 and subsystem analysis process S20 are set in the analysis result information 30. The requirement item name 701, group name 702, highest-order requirement item flag 703, lowest-order requirement item flag 704, and related-subsystems number 705 of each requirement item 301 of FIG. 5 are set in a requirement item name 601, group name 602, highest-order requirement item flag 603, lowest-order requirement item flag 604, and related-subsystems number 605, respectively, of the analysis result information 30 of FIG. 15.

<Result Display Process S30>

Figure 16:
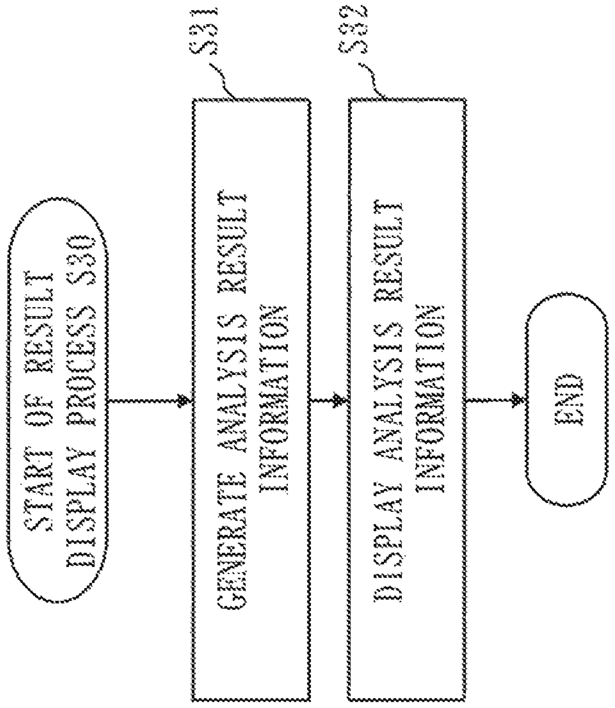
FIG. 16 is a flowchart illustrating result display process S30 according to Embodiment 1.

Result display process S30 according to this embodiment will be described with referring to FIG. 16.

In step S31, for each requirement item of the plurality of requirement items, the result display unit 140 sets the identifier identifying the group into which the requirement item has been classified, and the number of subsystems that are reached by tracing the relation from the requirement item. Specifically, the result display unit 140 generates the analysis result information 30 based on the requirement item name 701, group name 702, highest-order requirement item flag 703, lowest-order requirement item flag 704, and related-subsystems number 705 of each requirement item.

In step S32, the result display unit 140 displays the generated analysis result information 30 to the display equipment such as a display via the output interface 940.

*Other Configurations*

In this embodiment, the requirement analysis apparatus 100 acquires the item connection information via the input interface and stores it to the storage unit 130. Alternatively, the requirement analysis apparatus 100 may have a communication device and receive item connection information from another apparatus via the communication device. Here, the communication device is provided with a receiver and a transmitter. Specifically, the communication device is a communication chip or NIC (Network Interface Card). The communication device functions as a communication unit to communicate data. The receiver functions as a reception unit to receive data. The transmitter functions as a transmission unit to transmit data.

In this embodiment, the functions of the inclusion analysis unit 111, low-order inclusion search unit 112, group name change unit 113, highest-order extraction unit 114, lowest-order extraction unit 115, relation analysis unit 121, relationship search unit 122, and result display unit 140 of the requirement analysis apparatus 100 are implemented by software. Alternatively, as a modification, the functions of an inclusion analysis unit 111, low-order inclusion search unit 112, group name change unit 113, highest-order extraction unit 114, lowest-order extraction unit 115, relation analysis unit 121, relationship search unit 122, and result display unit 140 of a requirement analysis apparatus 100 may be implemented by hardware.

A configuration of the requirement analysis apparatus 100 according to the modification of this embodiment will be described with referring to FIG. 17.

Figure 17:
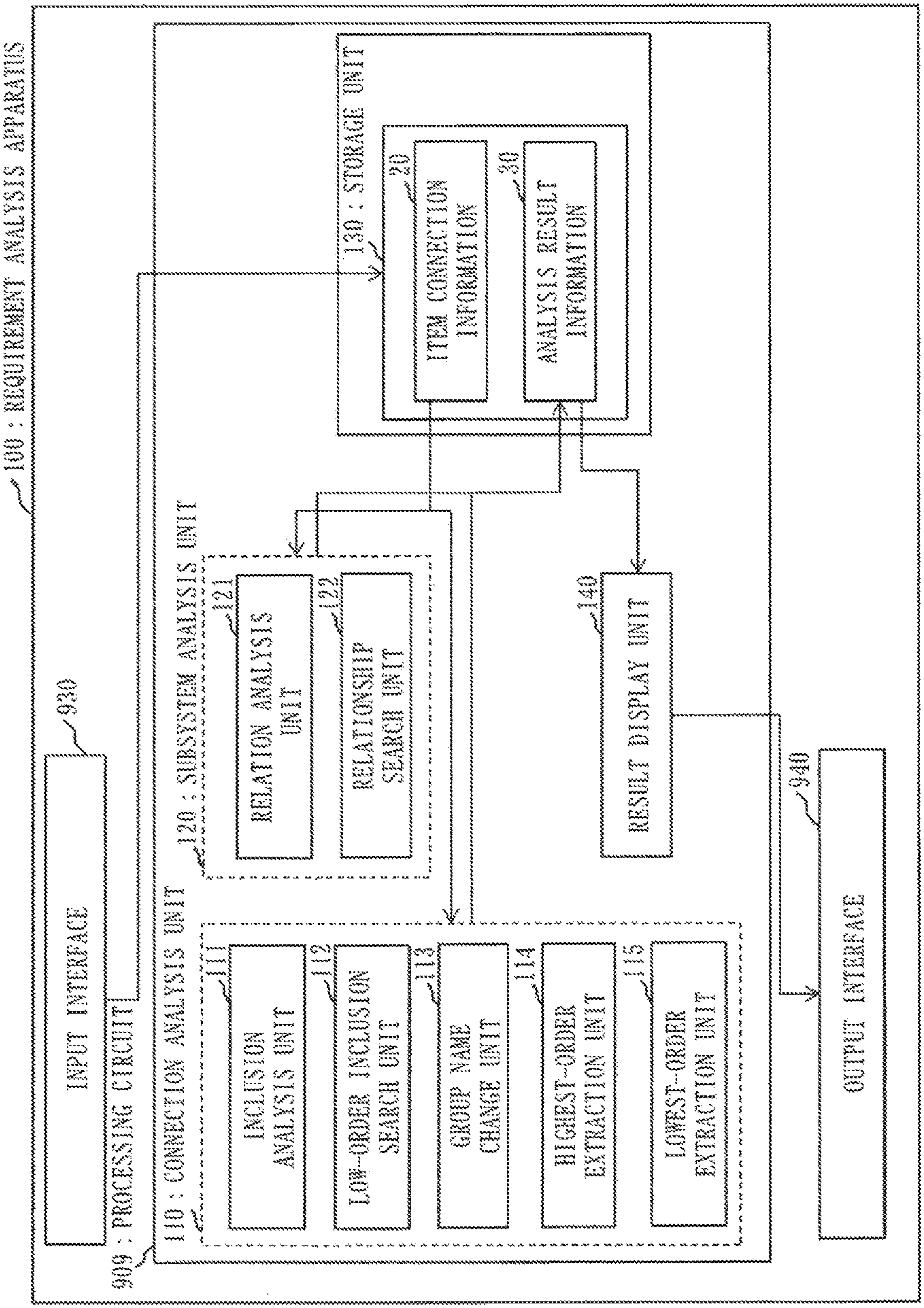
FIG. 17 is a block diagram of a requirement analysis apparatus 100 according to a modification of Embodiment 1.

As illustrated in FIG. 17, the requirement analysis apparatus 100 is provided with hardware devices such as a processing circuit 909, an input interface 930, and an output interface 940.

The processing circuit 909 is a dedicated electronic circuit to implement the functions of the inclusion analysis unit 111, low-order inclusion search unit 112, group name change unit 113, highest-order extraction unit 114, lowest-order extraction unit 115, relation analysis unit 121, relationship search unit 122, and result display unit 140 which are described above, and a storage unit 130. The processing circuit 909 is specifically a single circuit, a composite circuit, a programmed processor, a parallel-programmed processor, a logic IC, a GA, an ASIC, or an FPGA. GA is the abbreviation for Gate Array. ASIC is the abbreviation for Application Specific Integrated Circuit. FPGA is the abbreviation for Field-Programmable Gate Array.

The functions of the inclusion analysis unit 111, low-order inclusion search unit 112, group name change unit 113, highest-order extraction unit 114, lowest-order extraction unit 115, relation analysis unit 121, relationship search unit 122, and result display unit 140 of the requirement analysis apparatus 100 may be implemented by a single processing circuit 909, or by a plurality of processing circuits 909 by distribution.

As another modification, the functions of a requirement analysis apparatus 100 may be implemented by a combination of software and hardware. That is, some functions of the requirement analysis apparatus 100 may be implemented by dedicated hardware, and the remaining functions may be implemented by software.

The processor 910, storage device 920, and processing circuit 909 of the requirement analysis apparatus 100 are collectively called "processing circuitry". That is, whichever one among the configurations illustrated in FIGS. 1 to 17 the configuration of the requirement analysis apparatus 100 may correspond to, the functions of the requirement analysis apparatus 100 are implemented by the processing circuitry.

A "unit" may be read as a "step", "procedure", or "process". Also, the functions of the requirement analysis apparatus 100 may be implemented by firmware.

*Description of Advantageous Effects of Embodiment*

The requirement analysis apparatus 100 according to this embodiment narrows down test targets or determines the test phase by automatically evaluating the relevance of each requirement item. The requirement analysis apparatus 100 has a connection analysis unit which analyzes the inclusive connections among the requirement items first, then gathers a plurality of requirement items having inclusive connections into groups, and clarifies the highest-order requirement item and the lowest-order requirement item of each group. By the connection analysis unit, the requirement items that should be evaluated with regard to each test viewpoint can be determined. The requirement analysis apparatus 100 also has a subsystem analysis unit which calculates the number of subsystems related to the requirement items. The test phase can be determined based on the number of subsystems.

With the requirement analysis apparatus 100 according to this embodiment, requirement items that maintain inclusive connections are grouped based on information such as a requirement diagram that expresses relevance between requirement items or subsystems, so that the highest-order requirement item and the lowest-order requirement item can be clarified. Thus, with the requirement analysis apparatus 100 according to this embodiment, testing can be practiced based on some narrowed-down requirement items. Also, with the requirement analysis apparatus 100 according to this embodiment, a test phase to practice a test item corresponding to each requirement item can be clarified. Thus, with the requirement analysis apparatus 100 according to this embodiment, prevention of overlapping or missing out of test items can be expected.

In the embodiment described above, the requirement analysis apparatus is configured to include an inclusion analysis unit, a low-order inclusion search unit, a group name change unit, a highest-order extraction unit, a lowest-order extraction unit, a relation analysis unit, and a relationship search unit, as independent function blocks. However, the requirement analysis apparatus need not include the configuration described in the embodiment but can include an arbitrary configuration. The function blocks of the requirement analysis apparatus are arbitrary as far as they can implement the functions described in the above embodiment. The requirement analysis apparatus may be configured by any other combination of these function blocks, or any arbitrary block configuration.

Embodiment 1 has been described. A plurality of portions of this embodiment may be practiced in combination. Alternatively, only one portion of the embodiment may be practiced. Also, this embodiment may be entirely practiced, or partially practiced with any combination of its portions.

The embodiment described above is an essentially preferable exemplification and is not intended to limit the scope of the present invention, and the scope of the application product and use of the present invention. Where necessary, various modifications can be made in the embodiment described above.

REFERENCE SIGNS LIST

20: item connection information; 21: inclusion analysis result; 30: analysis result information; 100: requirement analysis apparatus; 110: connection analysis unit; 111: inclusion analysis unit; 112: low-order inclusion search unit; 113: group name change unit; 114: highest-order extraction unit; 115: lowest-order extraction unit; 120: subsystem analysis unit; 121: relation analysis unit; 122: relationship search unit; 130: storage unit; 140: result display unit; 301: requirement item; 302: subsystem; 303: inclusive connection; 304: derivative connection; 305: satisfaction connection; 306: parent requirement item; 307: child requirement item; 308: child subsystem; 401: productivity improvement group; 402: highest-order requirement item; 403: lowest-order requirement item; 501: related-subsystems number; 510: requirement analysis program; 520: requirement analysis method; 601, 701: requirement item name; 602, 702: group name; 603, 703: highest-order requirement item flag; 604, 704: lowest-order requirement item flag; 605, 705: related-subsystems number; 909: processing circuit; 910: processor; 920: storage device; 921: memory; 922: auxiliary storage device; 930: input interface; 940: output interface; S100: requirement analysis process; S10: connection analysis process; S11: inclusion analysis process; S12: lower-order inclusion search process; S13: group name change process; S14: highest-order extraction process; S15: lowest-order extraction process; S20: subsystem analysis process; S21: relation analysis process; S22: relationship search process; S30: result display process

The invention claimed is:

1. A requirement analysis apparatus, comprising:

processing circuitry configured to:

analyze item connection information which indicates preexisting connections between requirement items of a plurality of requirement items needed in an embedded system having a plurality of subsystems and which indicates a preexisting connection between each requirement item of the plurality of requirement items and each subsystem of the plurality of subsystems, wherein the analyzing is performed by:

prior to displaying analysis result information, classify the plurality of requirement items into groups based on the preexisting connections between the requirement items indicated in the item connection information, extract a number of subsystems that are reached by tracing the preexisting connections from each requirement item of the plurality of requirement items, based on the preexisting connections between the requirement items and based on the preexisting connection between each requirement item of the plurality of requirement items and each subsystem of the plurality of subsystems, and display, for each requirement item of the plurality of requirement items, the analysis result information which is set with an identifier identifying a group into which the requirement item has been classified, and the number of subsystems being reached by tracing the preexisting connections from the requirement item.

2. The requirement analysis apparatus according to claim 1, wherein the processing circuitry classifies, under one group, requirement items extracted from the plurality of requirement items by tracing the same preexisting connection from each requirement item of the plurality of requirement items.

3. The requirement analysis apparatus according to claim 2, wherein the processing circuitry extracts a requirement item of a highest order and a requirement item of a lowest order in one group, as a highest-order requirement item and a lowest-order requirement item, respectively.

4. The requirement analysis apparatus according to claim 3, wherein, for each requirement item of the plurality of requirement items, the processing circuitry sets a name of the group into which the requirement item has been classified, as the identifier, and information indicating whether the requirement item is the highest-order requirement item or the lowest-order requirement item in the group into which the requirement item has been classified.

5. The requirement analysis apparatus according to claim 4, wherein the item connection information indicates inclusive connections between the requirement items of the plurality of requirement items, and wherein the processing circuitry classifies, under one group, requirement items extracted from the plurality of requirement items by tracing the inclusive connections from each requirement item of the plurality of requirement items toward a lower order.

6. The requirement analysis apparatus according to claim 5, wherein the processing circuitry extracts a number of subsystems that are reached by tracing a connection between requirement items that maintain a hierarchical connection, or tracing a connection between each requirement item and each subsystem that maintain a hierarchical connection, from an upper-order item toward a lower-order item.

7. The requirement analysis apparatus according to claim 3, wherein the item connection information indicates inclusive connections between the requirement items of the plurality of requirement items, and wherein the processing circuitry classifies, under one group, requirement items extracted from the plurality of requirement items by tracing the inclusive connections from each requirement item of the plurality of requirement items toward a lower order.

8. The requirement analysis apparatus according to claim 7, wherein the processing circuitry extracts a number of subsystems that are reached by tracing a connection between requirement items that maintain a hierarchical connection, or tracing a connection between each requirement item and each subsystem that maintain a hierarchical connection, from an upper-order item toward a lower-order item.

9. The requirement analysis apparatus according to claim 2, wherein the item connection information indicates inclusive connections between the requirement items of the plurality of requirement items, and wherein the processing circuitry classifies, under one group, requirement items extracted from the plurality of requirement items by tracing the inclusive connections from each requirement item of the plurality of requirement items toward a lower order.

10. The requirement analysis apparatus according to claim 9, wherein the processing circuitry extracts a number of subsystems that are reached by tracing a connection between requirement items that maintain a hierarchical connection, or tracing a connection between each requirement item and each subsystem that maintain a hierarchical connection, from an upper-order item toward a lower-order item.

11. A requirement analysis method, comprising:

analyzing, by a requirement analysis apparatus, item connection information which indicates preexisting connections between requirement items of a plurality of requirement items needed in an embedded system having a plurality of subsystems and which indicates a preexisting connection between each requirement item of the plurality of requirement items and each subsystem of the plurality of subsystems, wherein the analyzing is performed by:

classifying the plurality of requirement items into groups based on the preexisting connections between the requirement items indicated in the item connection information;

extracting a number of subsystems that are reached by tracing the preexisting connections from each requirement item of the plurality of requirement items, based on the preexisting connections between the requirement items and based on the preexisting connection between each requirement item of the plurality of requirement items and each subsystem of the plurality of subsystems; and displaying, for each requirement item of the plurality of requirement items, analysis result information which is set with an identifier identifying a group into which the requirement item has been classified, and the number of subsystems being reached by tracing the preexisting connections from the requirement item.

12. A non-transitory computer readable medium storing a requirement analysis program of a requirement analysis apparatus, the requirement analysis program causing the requirement analysis apparatus being a computer, to execute:

an analyzing process of analyzing item connection information which indicates preexisting connections between requirement items of a plurality of requirement items needed in an embedded system having a plurality of subsystems and which indicates a preexisting connection between each requirement item of the plurality of requirement items and each subsystem of the plurality of subsystems, wherein the analyzing process is performed by:

a connection analysis process of classifying the plurality of requirement items into groups based on the preexisting connections between the requirement items indicated in the item connection information;

a subsystem analysis process of extracting a number of subsystems that are reached by tracing the preexisting connections from each requirement item of the plurality of requirement items, based on the preexisting connections between the requirement items and based on the preexisting connection between each requirement item of the plurality of requirement items and each subsystem of the plurality of subsystems; and a result display process of displaying, for each requirement item of the plurality of requirement items, analysis result information which is set with an identifier identifying a group into which the requirement item has been classified, and the number of subsystems being reached by tracing the preexisting connections from the requirement item.

* * * * *